United States Patent
Murray

(10) Patent No.: US 7,237,341 B2
(45) Date of Patent: Jul. 3, 2007

(54) STUDFINDER AND LASER LINE LAYOUT TOOL

(75) Inventor: John C. Murray, Canton, CT (US)

(73) Assignee: The Stanley Works, New Britain, CT (US)

( * ) Notice: Subject to any disclaimer, the term of this patent is extended or adjusted under 35 U.S.C. 154(b) by 334 days.

(21) Appl. No.: 10/682,806

(22) Filed: Oct. 10, 2003

(65) Prior Publication Data

US 2005/0078303 A1    Apr. 14, 2005

(51) Int. Cl.
*G01B 11/26*   (2006.01)
*G01C 15/00*   (2006.01)

(52) U.S. Cl. ..................................... 33/286
(58) Field of Classification Search ............... 33/286, 33/375

See application file for complete search history.

(56) References Cited

U.S. PATENT DOCUMENTS

| | | | |
|---|---|---|---|
| 2,743,528 A * | 5/1956 | Posthauer, Sr. | 33/375 |
| 2,915,829 A * | 12/1959 | Baxter | 33/375 |
| 4,700,489 A | 10/1987 | Vasile | |
| 5,063,679 A | 11/1991 | Schwandt | |
| 5,148,108 A | 9/1992 | Dufour | |
| 5,539,990 A | 7/1996 | Le | |
| 5,673,492 A * | 10/1997 | Williams | 33/286 |
| 5,864,956 A | 2/1999 | Dong | |
| 6,195,902 B1 | 3/2001 | Jan et al. | |
| 6,493,955 B1 | 12/2002 | Moretti | |
| 6,502,319 B1 | 1/2003 | Goodrich et al. | |
| 6,674,276 B2 | 1/2004 | Morgan et al. | |
| 6,694,629 B2 | 2/2004 | Goodrich | |
| 6,735,879 B2 | 5/2004 | Malard et al. | |
| 6,914,930 B2 | 7/2005 | Raskin et al. | |
| 2001/0049879 A1 | 12/2001 | Moore, Jr. | |
| 2002/0178596 A1 | 12/2002 | Malard et al. | |
| 2004/0187327 A1 | 9/2004 | Levine | |
| 2004/0255477 A1 | 12/2004 | Levine et al. | |
| 2004/0258126 A1 | 12/2004 | Levine | |

(Continued)

FOREIGN PATENT DOCUMENTS

EP    1 341 005 A2    9/2003

(Continued)

OTHER PUBLICATIONS

British Search Report for Published UK Patent Application No. GB 2407385 dated Feb. 9, 2005.

*Primary Examiner*—Christopher W. Fulton
(74) *Attorney, Agent, or Firm*—Pillsbury Winthrop Shaw Pittman LLP

(57) ABSTRACT

A layout tool includes an object detector constructed and arranged to detect the location of a vertically extending edge portion of an object hidden from view behind a generally vertically extending wall surface, a light source that is capable of projecting a line of light along the wall surface, and an angular orientation mechanism operably coupled to the light projection mechanism. The angular orientation mechanism is operable to establish that the line of light is vertical. The light source and the object detector are operatively interengaged such that when a vertically extending edge is detected by the object detector, a vertically extending line of light projected on the surface by the light source indicates the location of a vertically extending edge portion of the hidden object.

40 Claims, 14 Drawing Sheets

U.S. PATENT DOCUMENTS

| | | |
|---|---|---|
| 2005/0022399 A1 | 2/2005 | Wheeler et al. |
| 2005/0155238 A1 | 7/2005 | Levine et al. |

FOREIGN PATENT DOCUMENTS

| | | |
|---|---|---|
| GB | 2 389 193 A | 12/2003 |
| GB | 2 390 498 A | 1/2004 |
| WO | WO 92/16858 | 10/1992 |
| WO | EP 0 981 037 A1 | 2/2000 |
| WO | WO 02/093108 A1 | 11/2002 |
| WO | WO 03/066349 A1 | 8/2003 |

* cited by examiner

STUDFINDER AND LASER LINE LAYOUT TOOL

FIELD OF THE INVENTION

The present invention is generally related to construction tools and to methods for using the same.

BACKGROUND OF THE INVENTION

Construction and home improvement projects often require the ability to determine the location of structures hidden from view (e.g., studs, joists, beams, or wires hidden behind a wall board) and/or to survey and mark an area or a surface to guide the construction process. Prior to mounting shelves on a wall, for example, a worker may wish to determine the location of hidden structural members (e.g., studs) behind the wall surface (e.g., sheetrock) which can provide structural support for the shelves and may wish to establish markings on the wall which indicate where the shelves should be anchored and positioned on the wall during installation. Floors and ceilings may be marked to indicate the locations of joists and/or may be marked with guidelines before a covering (e.g., floor or ceiling tile) is installed.

Layout operations are often carried out over large areas. For example, a layout operation for tiling a floor may involve the entire surface area of the floor. ayout operations often involve surfaces and structures that are difficult to access (e.g., high ceilings and ceiling joists). These operations are therefore frequently time consuming and require the participation of more than one worker. There is a need to make layout operations more efficient.

SUMMARY

Aspects of the invention may be embodied in a tool comprising a housing, an object detector for detecting the location of a vertically extending object hidden from view behind a generally vertically extending wall surface, a light source that is capable of projecting a line of light along the wall surface, and an angular orientation mechanism operably associated with the light source. The angular orientation mechanism is operable to establish that the line of light is vertical. The light source and the object detector are oriented with the housing such that when a vertically extending edge is detected by the object detector and the angular orientation mechanism establishes that the light is vertical, the line of light projected on the surface extends along the surface so as to indicate the location of the vertically extending object.

Other aspects may be embodied in an object detector comprising a body, an object detector carried by the body, said detector operable to detect a distance between a reference point on the main body and an object hidden from view behind a surface, a display carried by the main body, and a display circuit that receives a signal from the object detector and generates dynamic indicia on the display in the form of a series of concentric rings of decreasing diameter as the main body approaches the hidden object.

Another aspect relates to a tool for detecting an object hidden behind a surface. The tool includes a body, an object detector carried by the body, a light source carried by the body, and an angular orientation mechanism that can establish that light projected from the light source is disposed in a desired orientation.

One aspect of the invention is simply directed to the combination of a stud finder and a laser level device integrated into one tool.

Other aspects, features, and advantages of the present invention are apparent from the following detailed description of the illustrated embodiment, the accompanying drawings, and the appended claims.

DETAILED DESCRIPTION

Figure 1:
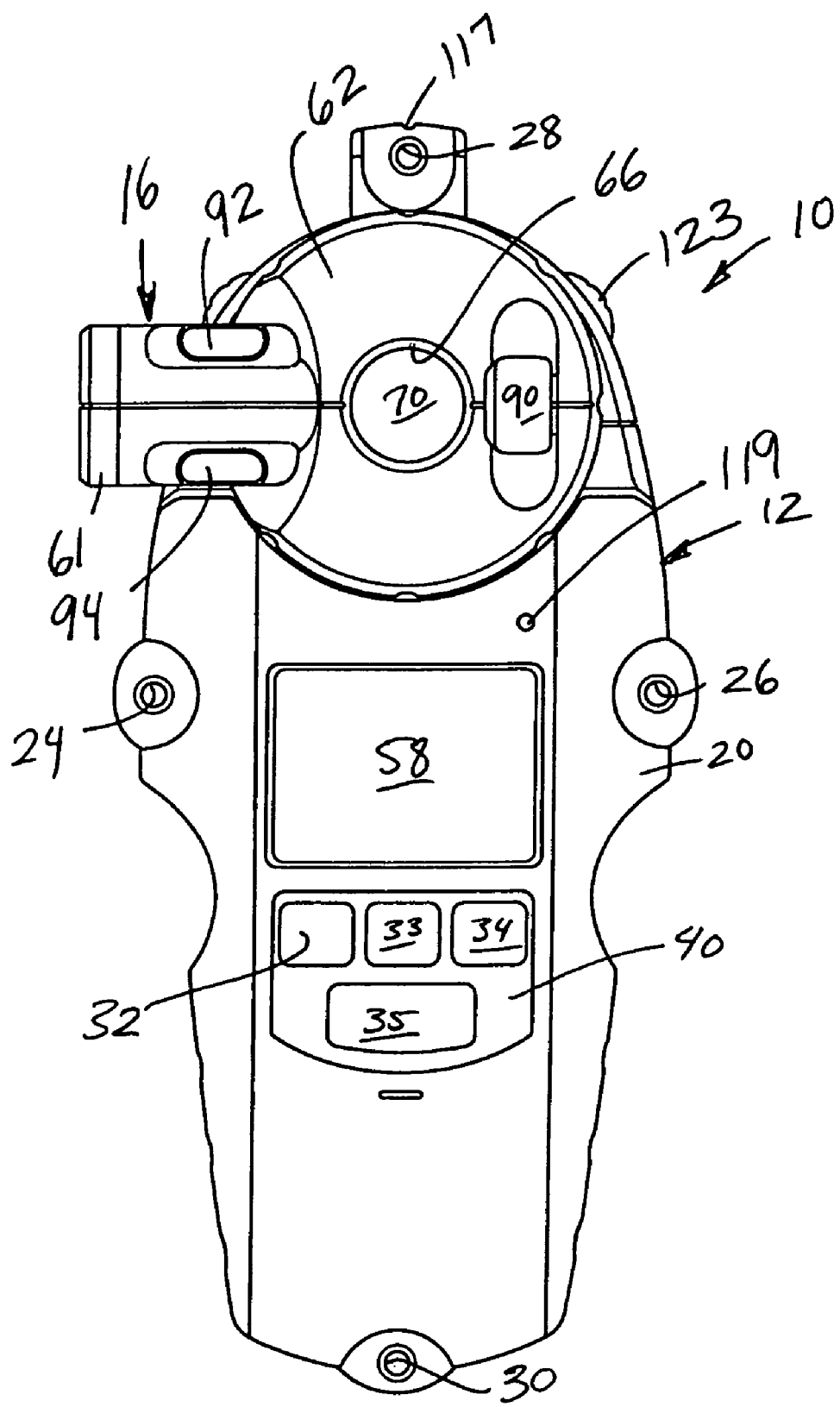
FIG. 1 is a front elevational view of an illustrative embodiment of a construction tool constructed according to principles of the invention.

FIG. 1 is a front plan view illustrating an example of a portable, handheld tool 10 which embodies some of the principles of the present invention. The layout tool 10 includes a main body 12, an electronic object detector 14 (see FIG. 6) carried by and housed within the main body 12 and a light source 16 carried by the main body 12. The tool 10 includes an angular orientation mechanism (e.g., level vials 90, 92 and/or 94) operable to enable a worker to orient a line of light emitted by the light source 16 and/or to orient the main body 12.

The object detector 14 may be operated to detect the location of an object or of an edge of an object (e.g., a stud, joist, beam, pipe, wire) hidden from view behind a surface such as a wall, ceiling or floor surface. The light source 16 projects a line of light on the surface and may be used to assist a worker during a layout or stud finding operation. More specifically, the light source 16 may be operable to project a plane of light that manifests as a line of light along a horizontal, vertical or other surface. The light source 16 may be used in conjunction with the object detector 14 to indicate the location of a hidden object behind the surface with a projected line of light. The light source 16, angle orientation mechanism and the main body 12 may also be used in layout operations not involving the object detector 14 (e.g., when the electronic object detector is "off"). The object detector 14 optionally includes the capability of detecting the location of live wires hidden behind a wall, floor or other surface.

In one embodiment, the live wire detection capability can be achieved with a separate sensor and circuit, which is separate from the sensor and circuit used to detect metal and wood. In another embodiment, three separate circuits are used, one each for metal, wood and live wire. It should be understood that only a single sensor for detecting a single type of object (e.g., only wood studs) may also be provided without departure from the principles of the present invention.

The main body 12 is a hollow, shell-like structure which may be constructed of a plastic (e.g., a molded plastic) or other suitable material. The illustrated main body 12 is comprised of mating body halves 20, 22 (see FIG. 3, for example) which may be secured to one another using fasteners, an adhesive, or any other suitable means. The main body 12 is shaped to form a pair of side openings 24, 26 and a pair of end openings 28, 30. The end openings 28, 30 are aligned with an imaginary longitudinally extending center axis of the main body 12. The side openings 24, 26 are located on opposite sides of the imaginary longitudinal central axis. In the illustrative embodiment, the side openings 24, 26 are equally spaced from the imaginary central axis and an imaginary line drawn between the side openings 24, 26 is perpendicular to the imaginary central axis. As explained below, the side openings 24, 26 and the end openings 28, 30 may be used to removably anchor or secure the layout tool 10 to a surface (e.g., a vertical wall surface or a horizontal floor or ceiling surface) by use of pins or the like that extend through the openings and into the surface behind the body 12. One or both of the end openings 28, 30 may be used to mark the location of a hidden object such as a stud edge thereof (using a pencil or a sharp instrument) upon detection thereof as will be described. The main body 12 further includes a generally V-shaped notch or recess 117 that is located on the imaginary longitudinally extending central axis thereof. The recess 117 may be used as a reference point on the main body 12 to indicate the location of a hidden object (such as a stud edge) and may be used to mark the location thereof on a wall or other surface (e.g., using a pencil or sharp instrument).

The electronic components or circuitry comprising the object detector 14 are housed in the main body 12. The object detector 14 preferably comprises circuitry that is typically found in known studfinder devices used for detecting wooden studs, metal studs, live wires, and the like. Examples of suitable object detecting circuitry that can be used in the present invention are disclosed in U.S. Pat. Nos. 6,215,293 to Yim; 6,211,662 to Bijawat, et al.; 4,859,931 to Yamashita et al; 5,438,266 to Tsang; 5,352,974 to Hegel, 5,619,128 to Hegel, 4,099,118 to Franklin et al.; and 4,464,622 to Franklin, each of which are hereby incorporated by reference.

While different types of object detecting circuits or object detectors are known and contemplated herein, in one illustrative embodiment the detecting circuit employs a capacitive sensor or sensors for detecting hidden objects. The capacitive sensors or "density sensors" are positioned within the main body 12 such that when an edge of a hidden object is detected, the position of the edge corresponds to the location of the imaginary central axis (i.e., the axis extending between the end openings 28, 30 and the V-shaped notch 117). The capacitive sensors are oriented so that as the tool body 12 is moved across a surface behind which an object is hidden, the direction of movement of the layout tool 10 should be generally perpendicular to the imaginary central axis. When a stud edge is detected, as indicated to the user by an audible and/or visible indication, the notch 117 will be positioned above the edge that is hidden behind the surface being scanned.

The capacitive circuit may be provided with different sensitivity settings. For example, as known in the art, a sensitivity level can be selected by depressing a wood setting or mode switch 32, a metal setting or mode switch 33, or a deep scan or deep object setting or mode switch 34 mounted on the front of the main body 12.

A portion of the circuitry for the hidden object detecting circuits and the circuits for controlling and energizing the light source disposed in the light source 16 may be located on a circuit board 42 mounted within the main body 12. A battery compartment 44 located in the main body 12 houses a battery 46 which powers the operation of the tool 10. The compartment 44 is accessible through a compartment door 48 disposed on the back of the main body 12. The door 48 is flush with the back of the main body 12 and forms a part of a back surface 50 of the main body 12. The back surface 50 of the main body 12 may provide a contact surface for the layout tool 10 when the tool 10 is engaged with a surface (e.g., wall, floor).

Figure 5:
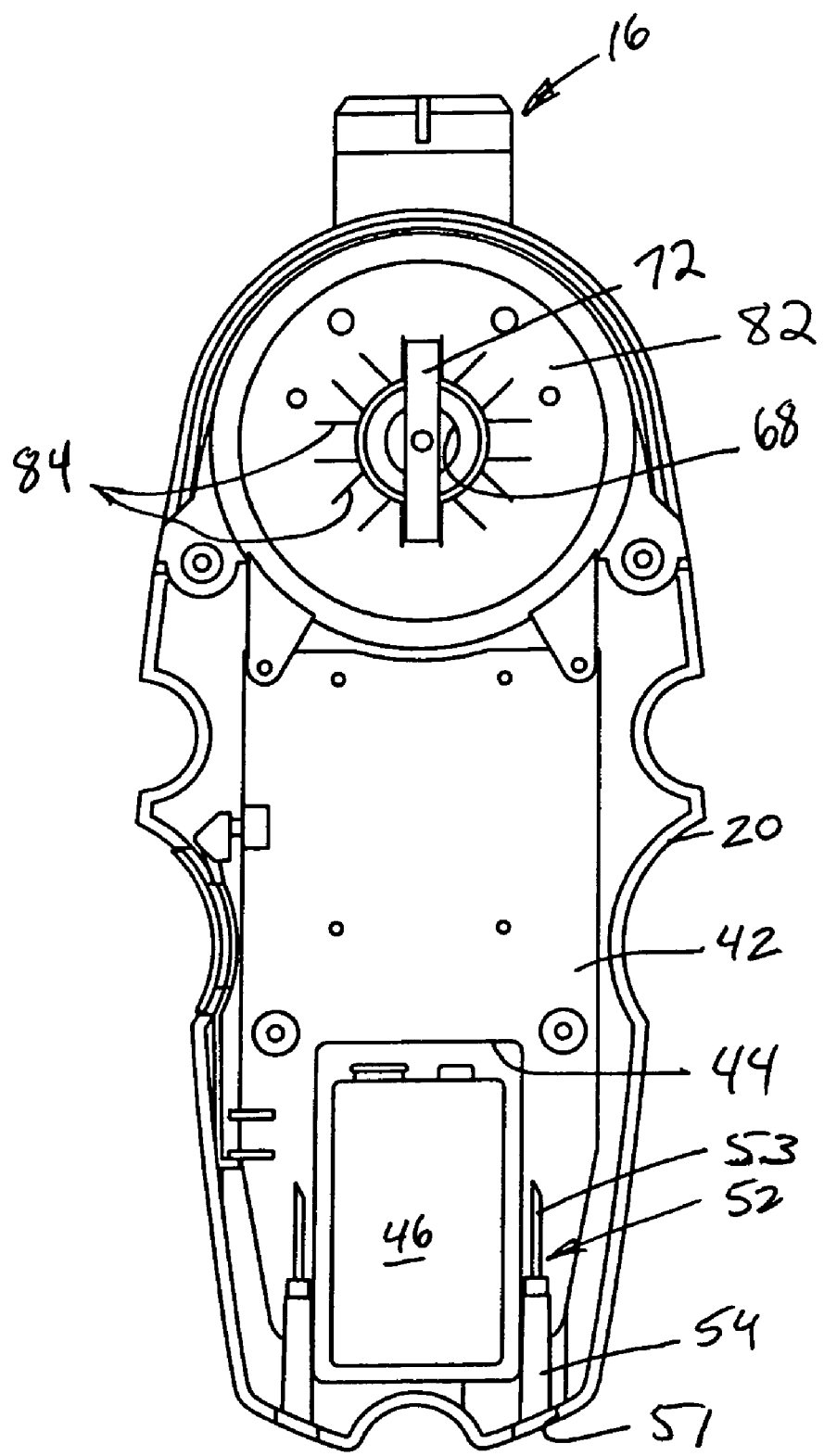
FIG. 5 is a back view of the layout tool FIG. 1 with a back housing portion thereof removed and not shown.

As mentioned, and as best shown in FIG. 5, an anchoring mechanism is provided to enable the tool 10 to be removably secured or anchored to a surface such as a wall surface or ceiling surface. The illustrative anchoring mechanism is comprised of pair of anchor pins 52. The anchor pins 52 are removably mounted for storage in recesses 51 formed in the main body 12. Each anchor pin 52 includes a pointed shaft portion 53 which may be constructed of a metallic material or other material of suitable strength for piercing sheetrock and other building materials and a retaining portion 54 which may be constructed of a molded plastic or other suitable material. The retaining portion 54 of each anchor pin 52 is shaped to be held within a respective recess 51 within the main body 12 by interference fit for anchor pin storage. The retaining portions 54 are also shaped to allow the anchor pins 52 to be easily handled, inserted in, and removed from a surface by grasping the retaining portion 54. The pins 52 are sized and configured to be received in one or more openings (e.g., 24, 26, 28 and 30) in the body 12 to enable the body to be secured to a wall surface.

An LCD screen or display 58 is mounted on the front face of the main body 12. The screen 58 is in electrical communication with the electrical circuitry of the tool 10 including the object detecting circuitry for detecting hidden objects and/or live wires. An object detecting on/off switch 60 is mounted on a side of the main body 12. The main body 12 is shaped to receive and be held within a gripping hand of a worker. The on/off switch 60 is located to enable a worker to maintain the on/off switch 60 in a depressed condition (that is, an "on" condition) while grasping or holding the tool 10 with one hand. The main body 12 may include a relatively soft, rubber-like or elastomeric material that cushions the gripping hand. The material may also provide a relatively high degree of frictional engagement with the gripping hand to provide a non-slip surface. The back surface 50 of the main body 12 may include padding appropriate to facilitate sliding of the main body 12 over a wall or other surface without damaging or unintentionally marking the surface.

The light source 16 is disposed within a light projection housing 62 which may be constructed of a plastic material (e.g., a molded plastic) or other suitable material. An outwardly extending end portion of the light projecting housing 62 may be covered in part by a relatively soft rubber-like or elastomeric material 61 (see FIG. 4, for example) which protects the light projection housing 62 and which protects any surfaces with which it may come into contact.

The light projecting housing 62 is movably mounted on the main body 12 to enable the angle or direction of a line of light projected therefrom to be adjusted (relative to the main body 12). More specifically, the light projection housing 62 is pivotally mounted on the main body 12 by means of a pivot mechanism shown in FIGS. 3 and 4. The pivot mechanism enables the light source 16 to be moved relative to the main body 12 to enable the light source 16 to selectively project a line of light in a multitude of directions along a surface. It should be appreciated that the light projection housing 62 and main body 12 may be considered as different components of the same body. The present invention contemplates that all components can be disposed in a single housing or enclosure constituting the body, or multiple enclosures that are integrated into what can also be considered as the body.

A locking mechanism may be included in the layout tool to lock the light source in an angular position. The illustrative layout tool 10, for example, includes a locking mechanism in the form a detent mechanism that is operable to releasably lock the light projection housing 62 to the main body 12 at predetermined angular intervals to facilitate positioning the light source 16 in selected positions of adjustment with respect to the main body 12 (see FIGS. 1 and 2).

The pivoting and locking mechanism includes a lock member 63 comprising a post portion 64, an enlarged button structure 70 at one end, and a locking structure or detent 72 at an opposite end. The locking member 63 may be constructed of a plastic material (e.g., a molded plastic) and may be of one piece or multi-piece construction. The lock member 63 extends through aligned openings 66, 68 in the light projection housing 62 and the main body 12, respectively. The button structure 70 is mounted in the opening 66 in the light projection housing 62 for axial movement (along an axis aligned with the post portion 64) between locking (FIG. 3) and unlocking positions (FIG. 4). The lock member 63 does not pivot relative to the light projection housing 62. That is, when the light projection housing 62 pivots, the lock member 63 and the light projection housing 62 pivot as a unit with respect to the main body 12. The light projection housing 62 is a form of an adjusting means that is operable to change the orientation of the line of light that is to be projected onto a surface. However, the present invention contemplates numerous other types of adjusting means that enable the light beam projected from the housing to be adjusted. For example, other mechanisms for moving the light source can be employed to enable the light source 16 to move either linearly or arcuately with respect to the main body 12. Alternately, the laser source 16 itself may be stationary relative to main body 12, an the use of mirrors, lenses, prisms or the like are employed to adjust the orientation of the beam. Furthermore, as described in greater detail later, a surface engaging structure (such as adjustable legs) can be used to adjust the orientation the body assumes relative to a surface on which the body is placed.

An annular collar member 74 and an annular disk- or ring-shaped structure 78 are mounted about the post portion 64 of the lock member 63. A coil spring 76 is disposed between the ring-shaped structure 78 and a wall portion 80 of the light projection housing 62. The spring 76 acting through the collar member 74 and the ring-shaped structure 78 biases the lock member 63 into its locking position.

A wall surface 82 on the main body 12 includes a plurality of recesses 84 (see FIG. 5). The spring 76 biases the locking structure 72 into releasable locking engagement with selected recesses to lock the light projection housing 62 in position of angular adjustment with respect to the main body 12. The housing 62 is released from locking engagement with the main body 12 by pressing on the button structure 70 which compresses the coil spring 76 and moves the locking structure 72 out of locking engagement with a recess. The light source 16 can be moved with respect to the main body 12 when the button structure 70 is in its depressed condition. The light projection housing 62 pivots freely with respect to the main body 12 when the button structure 70 is in its depressed condition. If the button structure 70 is released once pivotal movement is commenced, action of the spring 76 will automatically relock the housing 62 with respect to the main body 12 in a new position of adjustment determined by the circumferential spacing of the recesses 84 when the locking structure 72 enters another recess 84. In the illustrative embodiment, the light source 16 can be pivoted through a range of 180° (one hundred and eighty) degrees. The recesses 84 are spaced to relock the light source 16 to the main body 12 at 45° (forty five) degree intervals (see FIGS. 1 and 2) throughout the 180° degree range.

The light source 16 is in electrical communication with and powered by the battery 46. The light source 16 is preferably a laser light source, but any other appropriate light source may be used. The light source 16 is turned on when the user depresses switch 60 to commence an object finding operation. The light beam may be transmitted through a lens 88 (or alternatively, a prism or adjustable prism or prism mechanism) and outwardly through an aperture 90 in the light projection housing 62 onto a wall or other layout surface. The lens 88 may be constructed to emit the light in a planar configuration that manifests as a line of light on the surface against which the back 50 of the housing 12 is placed. The emitted light may be shaped to form a line of light on the surface with which the tool 10 is in contact (e.g., a wall or a horizontal floor surface) and on an adjacent surface (e.g., a ceiling above the wall, or a vertical wall surface when the tool is disposed on the floor). It should be appreciated that, as used in the claims herein, the term "scource" is intended to refer to the light generator (e.g., laser or other light generator) in combination with a device (e.g., lens, prism, or beam splitter, etc.) that projects the beam of light in a plane.

A light control switch 35 on the front of the main body 12 is operable to toggle the light source 16 on and off when the tool is not being used to detect hidden objects. The switches 32–35 may be covered by a tactile keypad membrane 40 which may be constructed of a plastic or rubber-like material which protects the switches 32–35 and the other electronic components in the main body 12 from dirt, moisture and the like.

The angular orientation mechanism of the present invention is carried by the body so as to establish that the line of light or other image projected from the light source is disposed in a desired orientation. The angular orientation mechanism in one illustrative embodiment of the layout tool 10 is comprised of a plurality of bubble vials 90, 92, 94. The bubble vials 90, 92, 94 may be used by the user to orient the body of the tool so as to ensure that the light projected by light source 16 is disposed at a desired orientation, such as vertical or horizontal (plumb or level). The bubble vials 90, 92, 94 are mounted on the light projection housing 62, but this is an example and not intended to be limiting. The bubble vials 90, 92, 94 could be mounted on the main body 12. Also, indicia may be provided on the main housing 12 for determining the angular orientation of the light projection housing 62 with respect to the axis of main body 12.

Figure 3:
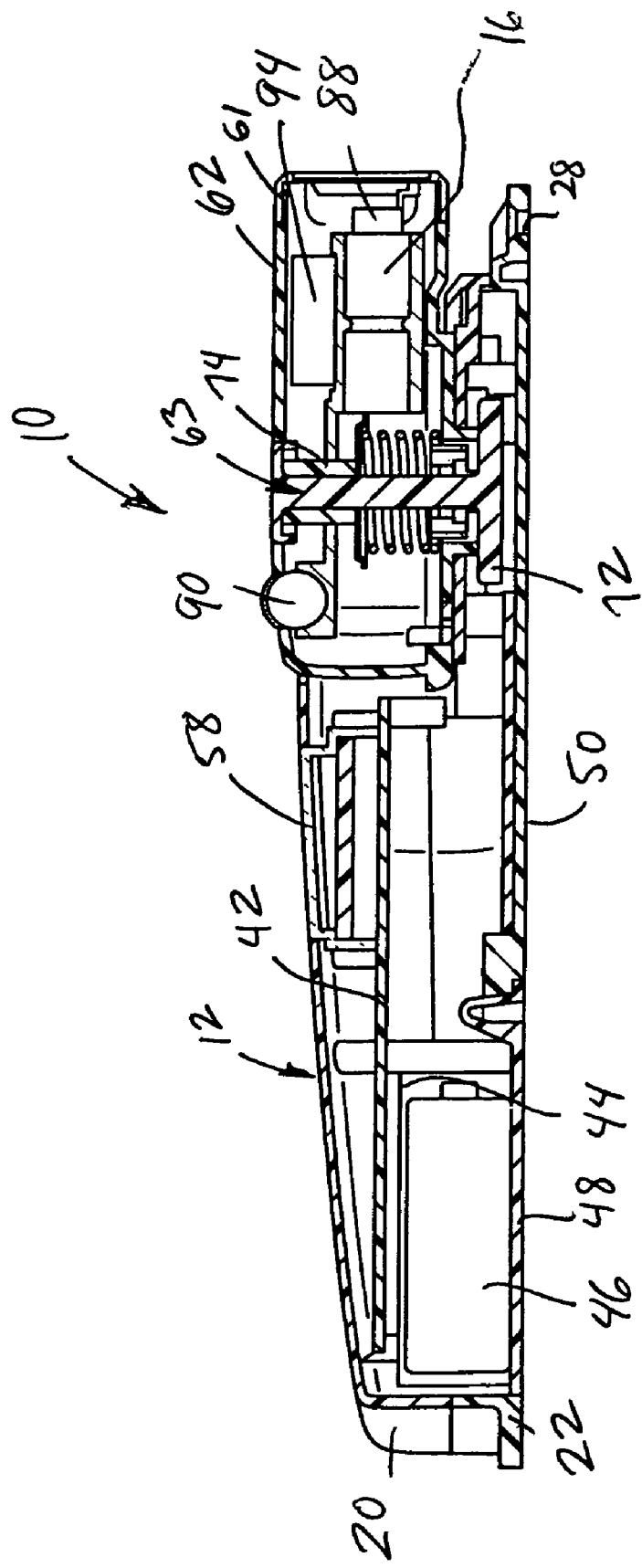
FIG. 3 is a cross-sectional view as indicated in FIG. 2.
Figure 4:
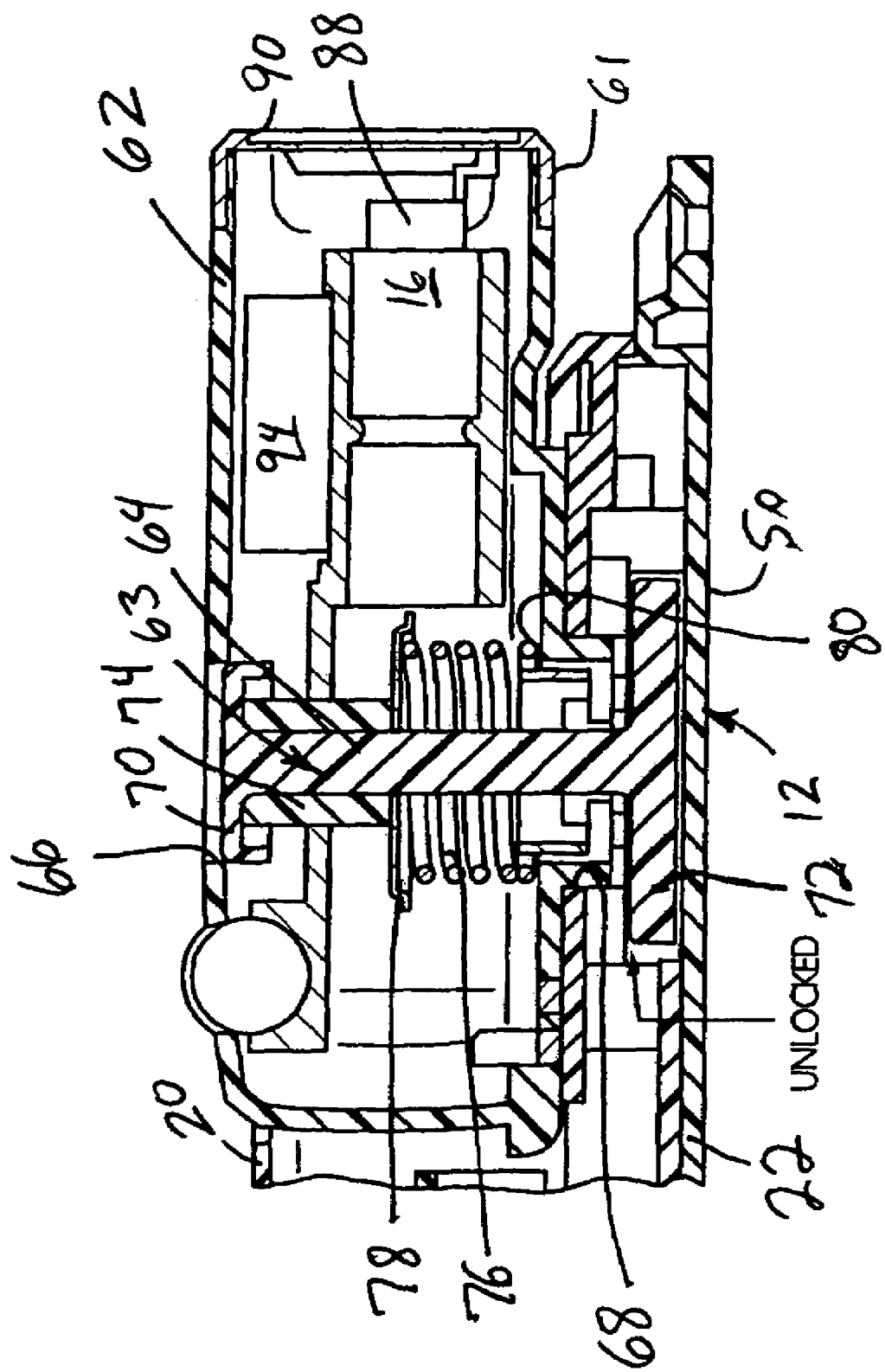
FIG. 4 is an enlarged view of a portion of the cross-section of FIG. 3 showing a locking member in a releasing position.

The bubble vial 90 may be used to establish that the longitudinal axis (extending between the end openings 28, 30) of the main body 12 is vertical when the light projection housing 62 is disposed in the 12 o'clock position as shown in FIG. 3. The light source and vial 90 are calibrated on the body such that when the bubble vial 90 establishes that the longitudinal axis of body 12 is vertical, this also establishes that the line of light from the light source 16 is vertical. By ensuring that the light beam is vertical as ascertained by the bubble vial 90, the user can assume that the light beam that impinges on the wall surface and manifests itself as a straight line that tracks on the wall surface along an object (e.g., the edge of the vertical stud) detected behind the wall surface. That is, the light source 16 (e.g., the laser) and the bubble vial 90 are accurately oriented with respect to the main body 12, such that when the housing 62 is in the 12 o'clock position as shown in FIG. 3, the line of light will track substantially exactly vertically when the bubble vial 90 so indicates (i.e., when the bubble is in the middle of the vial as known in the art). Also, when the object detector 14 is held such that the housing's longitudinal axis is generally vertical and moved generally horizontally in a direction perpendicular to the housing's longitudinal axis, and then detects the presence of the beginning of a vertical stud (i.e., the edge of the stud), the housing 12 is calibrated and oriented with respect to the object detector 14 and light source 16 so that the line of light emanating from light source 16 and projected on the wall surface will be aligned with the vertical stud edge when the object detector 14 provides a user-perceivable indication that the edge has been detected.

Similarly, bubble vial 92 may be used to establish that the line of light is horizontal when projected in a first horizontal direction (e.g., when the light projection housing 62 is in the 9 o'clock position to project the line of light to the left as in FIG. 1). Bubble vial 94 may be used to establish that the line of light is horizontal when the light is projected in the opposite direction (when housing 62 points in the 3 o'clock direction). Two separate bubble vials 92, 94 are provided because each bubble vial 92, 94 has a slight curvature that makes it slightly asymmetrical to facilitate centering of the bubble depending on whether the housing points in the 3 o'clock or 9 o'clock directions; vial 92 is calibrated for the 9 o'clock position and vial 94 is calibrated for the 3 o'clock position. If a more symmetrical vial is used, then a single vial can replace the two separate vials 92, 94.

The use of one or more bubble vials to facilitate angular orientation is illustrative only. Other angular orientation instrumentalities can be used as well. For example, in other contemplated embodiments, an electronic inclinometer as known in the art may be used as the angular orientation mechanism. The inclinometer may be mounted on the main body portion 12 of the tool, particularly in embodiments of the layout tool which provide the worker with means for determining the angular position of main body and hence the light source. The inclinometer may also be provided on the housing 62 portion of the body 12. It is contemplated to use an electronic inclinometer in conjunction with a microprocessor to determine angular orientation of the main body 12 and/or light source 16 and to display the angular orientation on a visual display, such as the LCD display 58. The precision of the angular measurements may be in degrees or in fractions of a degree.

As another example, the angular orientation mechanism may be a pendulum mechanism for establishing that the line of light from the light source is disposed in a desired orientation, such as horizontal or vertical as known in the art. The pendulum-mechanism may carry the light source itself or may carry a mirror that reflects light from the light source. The pendulum uses gravitational forces to ensure that the beam of laser light projects at a desired angle, such as vertically or horizontally, irrespective of the orientation of the housing 12.

OPERATION

Figure 6:
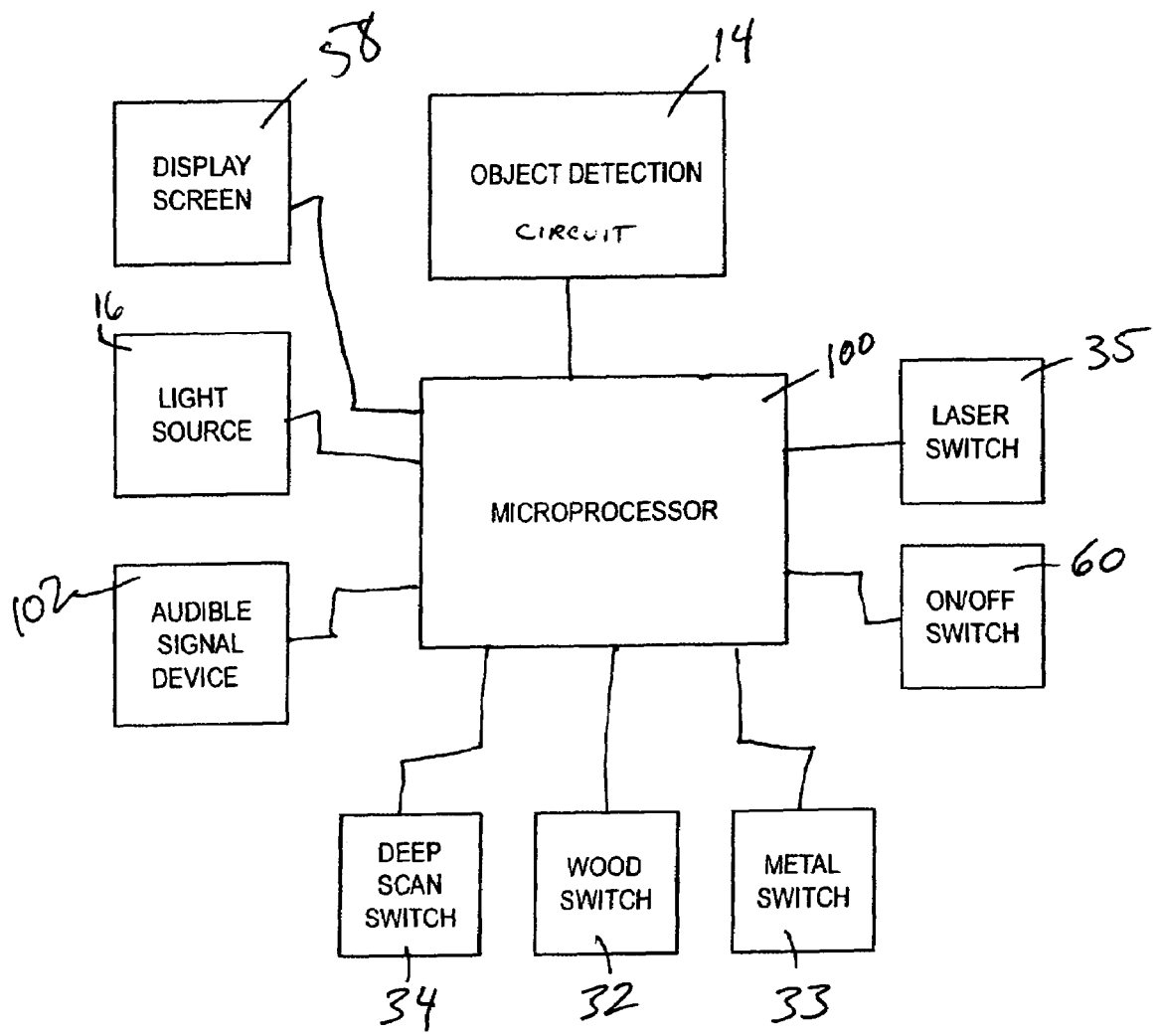
FIG. 6 is a example schematic view showing electronic components of the layout tool.

The operation of the electronic circuits is controlled by a microprocessor 100. The object detector 14, the switches 32, 33, 34, 35, the LCD screen 58, the light source 16, and an audible signal device 102 may be electronically communicated to the microprocessor 100 as shown in FIG. 6. The audible signal device 102 preferably includes a speaker and may be programmed to sound a unique audible signal for a number of events, some of which events are described below. The microprocessor 100 can be programmed to control operation of the tool 10 in a variety of ways.

In one embodiment where multiple modes of operation are provided, to operate the object detector 14, a worker first selects a mode of operation of the object detector 14 (wood mode, metal mode, live wire mode, deep scanning mode, etc.) based on factors which include the location (depth) of the object to be detected, and the materials from which the hidden object is constructed. The tool may be programmed to select the wood mode by default. In addition, in some embodiments, no mode selection is required because the tool 10 operates in only one mode (e.g., wood detection at a single depth). After mode selection (where applicable), the worker calibrates the object detector. The object detector is calibrated by placing the back surface 50 of the main body 12 against a wall or floor surface in a location where there is no stud or other hidden object and then the on/off button is pushed to its "on" position and held for a predetermined time period (typically 1–3 seconds) while the tool 10 goes through a programmed calibration cycle. At the same time, light source 16 is energized and projects a light beam on the wall or surface.

Figure 7:
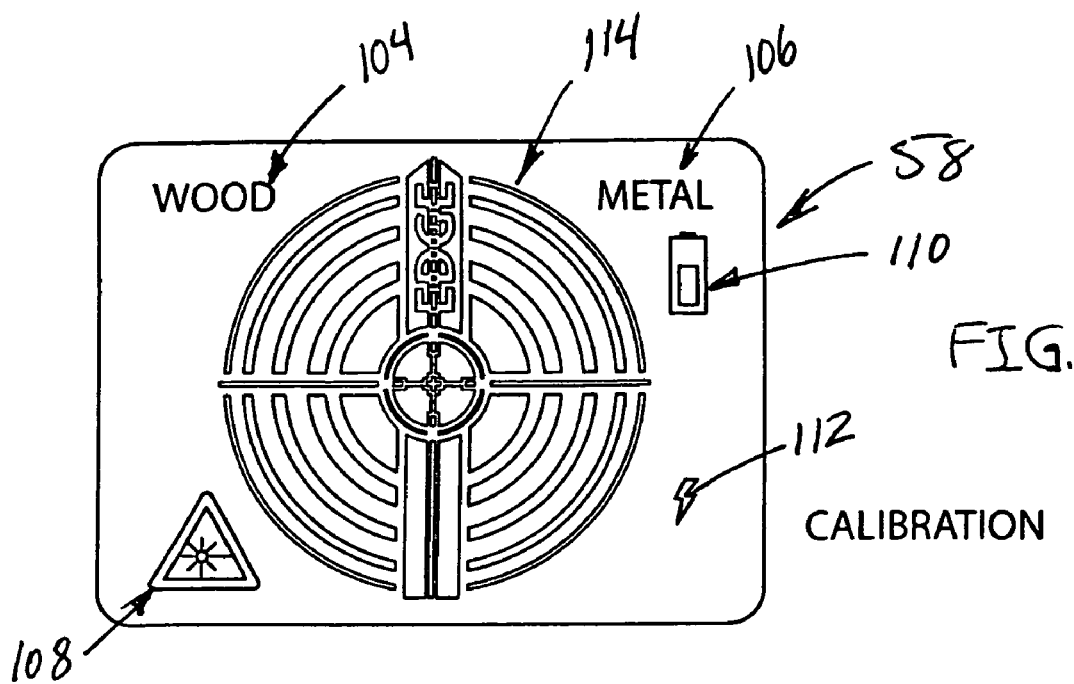
FIGS. 7–14 are example screen displays that can be displayed during operation of the tool.

During calibration, all indicators on the LCD screen 58 are displayed (see FIG. 7). Generally, during operation, the screen 58 indicates the mode of operation by displaying the word "wood" 104 or "metal" 106, indicates that the laser light source is on by displaying a generally triangular symbol 108, indicates battery level with battery symbol 110, indicates when the live wire detector is operating by displaying a lightening bolt symbol 112, and indicates when an edge is being approached and when an edge has been reached by displaying symbols in the central region 114 of the screen 58 as explained below.

Figure 8:
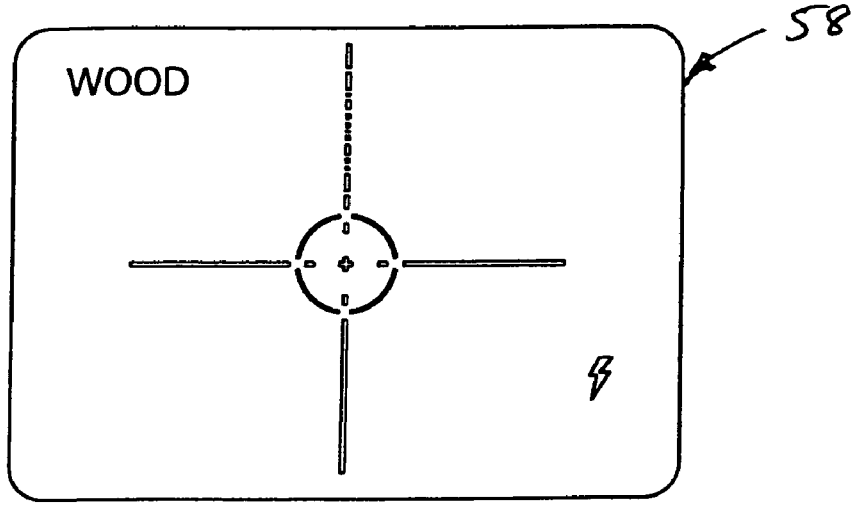

When calibration is complete, an audible sound is emitted from the audible signal device 102 and the screen 58 display changes to that shown in FIG. 8. In the event that calibration fails because the device has been placed directly over a hidden object in the first instance, the graphic indicators on the screen flash and an audible sound is emitted from the audio signal device 102. The worker would then try calibrating the layout tool 10 in a different location on the surface.

Figure 17:
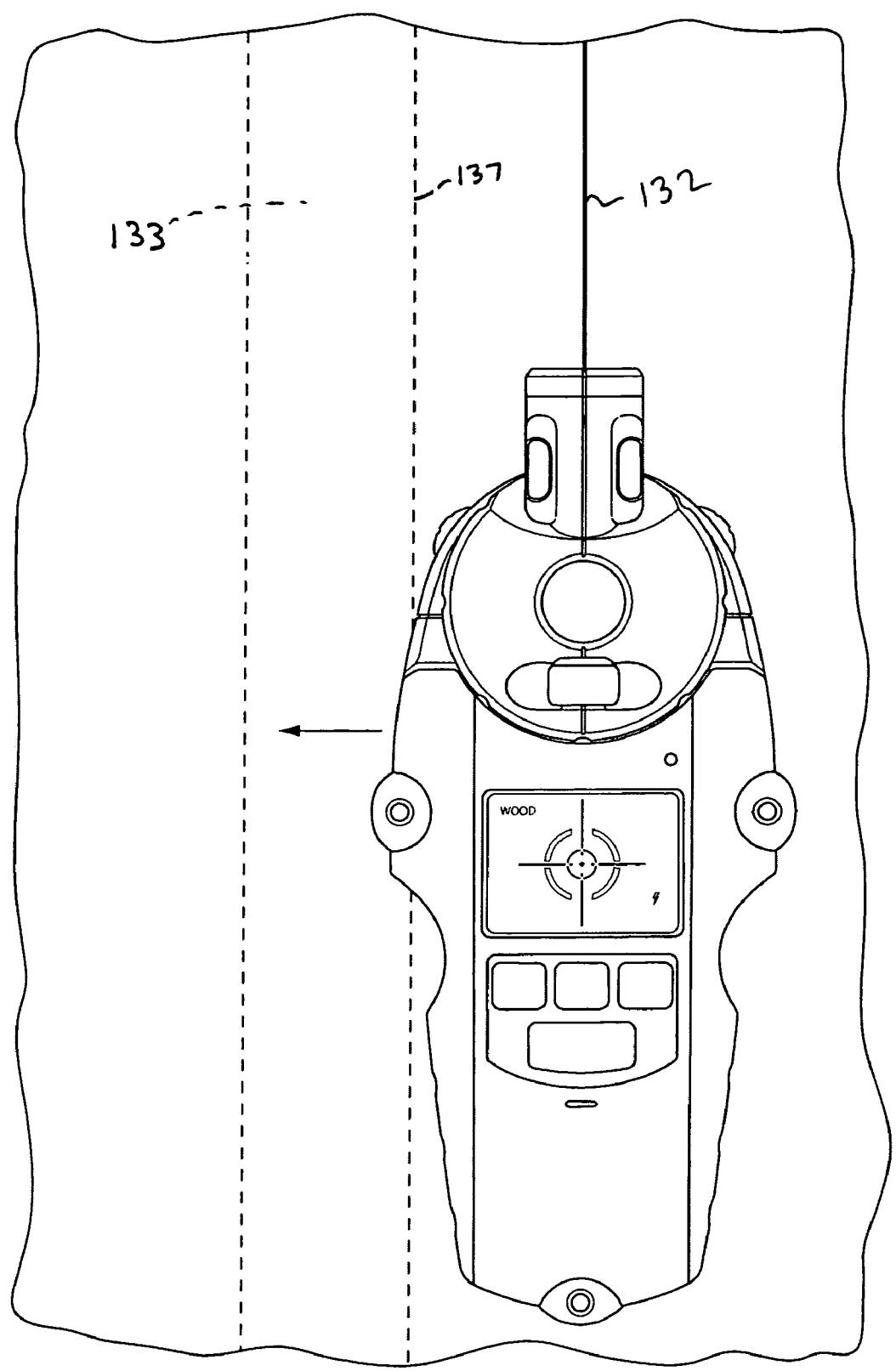
FIG. 17 is a front plan view of the tool in use, while searching for a vertical stud.

After calibration is complete, the worker continues to hold the on/off switch in its "on" position during scanning operation of the tool to maintain the tool in its calibrated condition to scan for and locate hidden objects hidden under a particular surface. Generally, to locate an edge of a hidden object, the worker slides the tool 10 across the surface. For example, when scanning a vertically extending wall to locate a vertically extending stud 133, the user manually moves the tool 10 generally horizontally (see arrow in FIG. 17) across the wall surface, with the notch 117 disposed at the top of the tool as shown in FIG. 17. In one embodiment, the object detection circuit 14 is communicated through the microprocessor 100 to the LCD display 58 so as to generate dynamic indicia on the display screen in the form of a series of concentric rings of decreasing diameter as the main body approaches the hidden object.

It should be appreciated that the electrical components illustrated in FIG. 6 are exemplary only and can take several different forms. For example, the object detector of the present invention can be of any known type in the art or any equivalent device and is not limited to the object detection circuit 14 in combination with microprocessor 100 as illustrated. Also, the object detection circuit may be considered as part of the microprocessor 100. Also, circuits of either an analogue or digital type can be used for the object detector as contemplated herein. Thus, it should be appreciated that the term "object detector" as used herein has a broad connotation to cover detecting circuits and/or processors that are capable of detecting objects hidden from view behind other structures, and particularly studs or joists or the like hidden behind walls or floors. It should also be appreciated that the object detector can be considered to include at least one element, such as an audible or visual indicator (e.g., such as a visual display or audible tone generating mechanism) to advise the user when an object has been detected.

Figure 9:
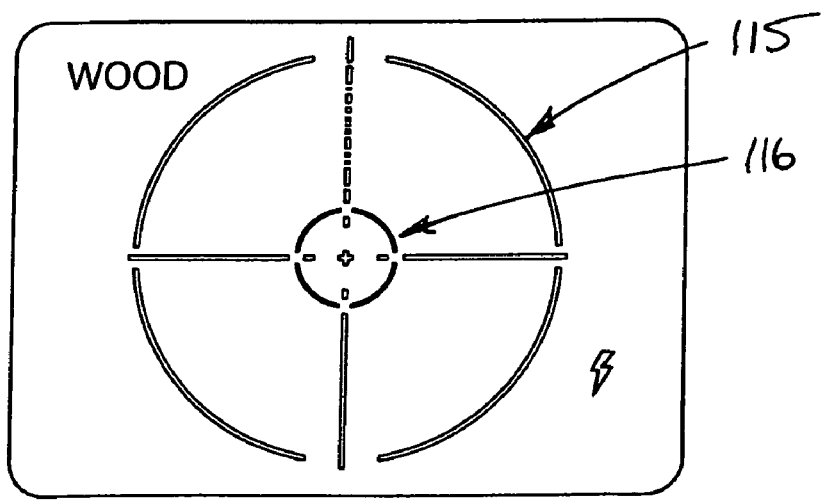
Figure 10:
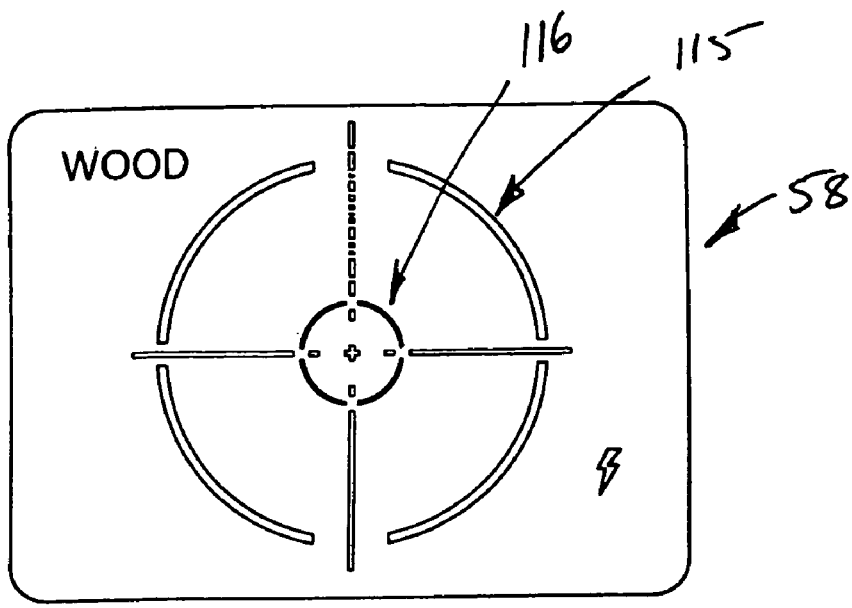
Figure 11:
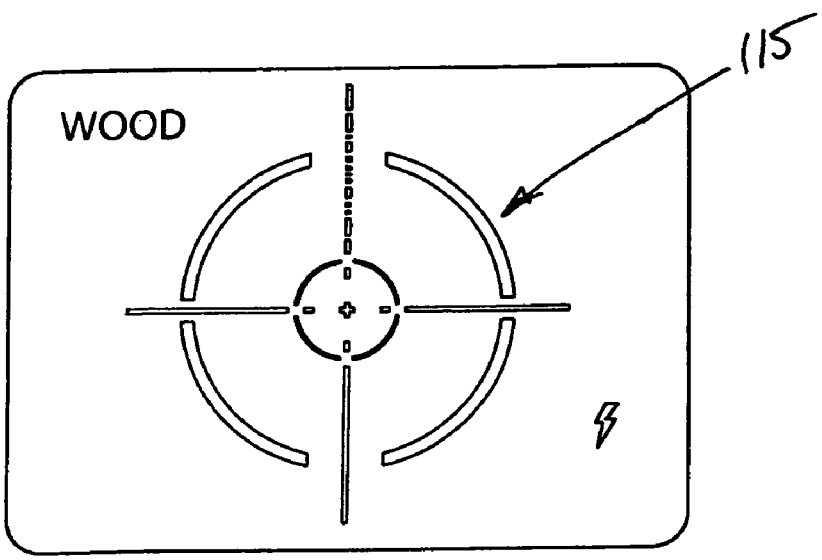
Figure 12:
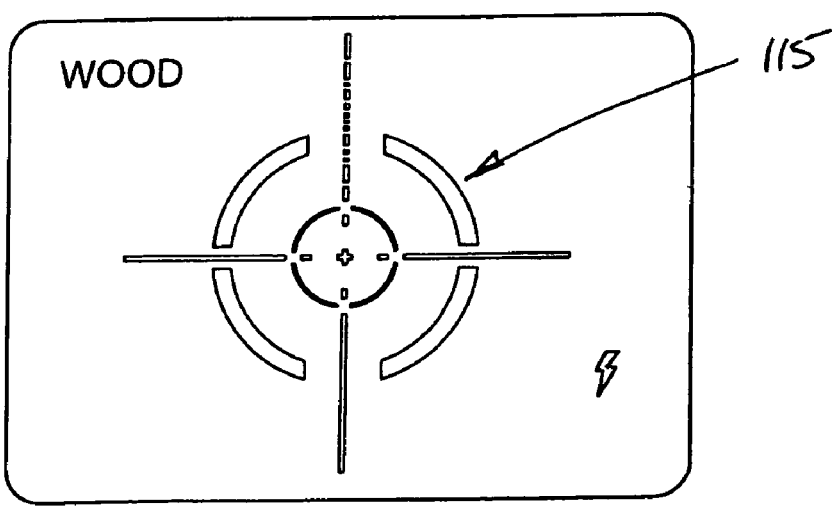
Figure 13:
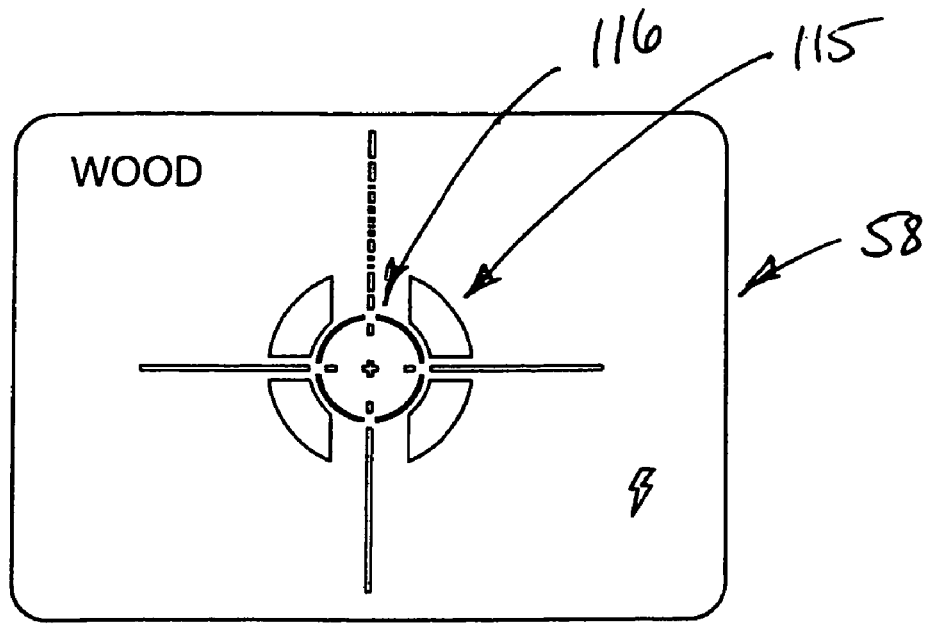

In the illustrative embodiment of the tool 10, as the tool 10 approaches a stud 133, a graphic representation of a ring or, alternatively, a split ring 115 appears on the screen surrounding a central target 116 (FIG. 9). As the tool 10 continues to approach the stud, the diameter of the ring 115 decreases and the width of the circular line representing the ring 115 may thicken to produce a series of rings 115 of decreasing size (diameter) which approach the central point or target 116 (see FIGS. 9–13). The series of rings 115 may approach the central target 116 in a series of discrete steps (corresponding to discrete ring diameters) or continuously (corresponding to a ring having a continuously changing diameter). The rings 115 may be represented using a series of discrete points (e.g., on a display which utilizes an array of discrete light emitting diodes) or, alternatively, on a display capable of decreasing the size of a ring essentially continuously (e.g., a video screen such as a cathode ray tube).

Figure 14:
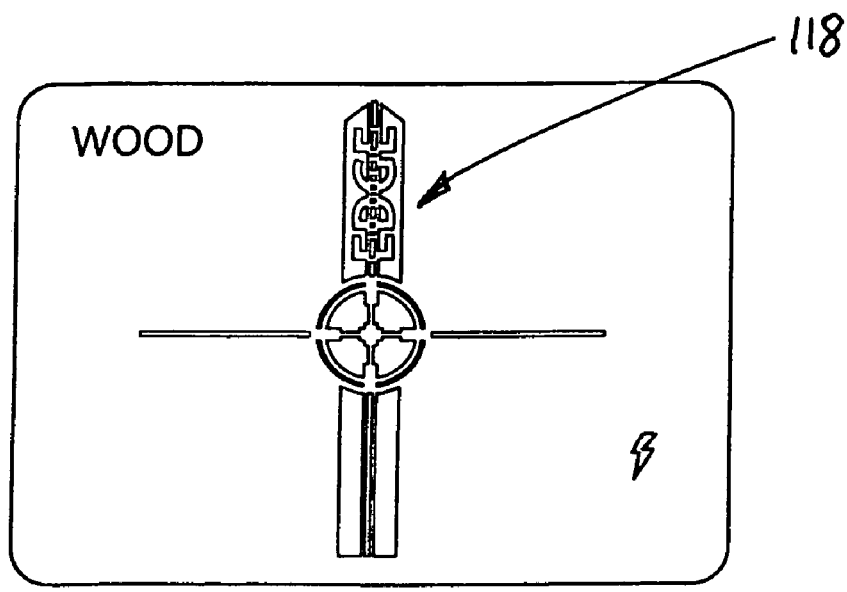

When an edge is detected, a vertical bar 118 bearing the word "EDGE" appears on the screen 58 (see FIG. 14) and a distinct audible sound is emitted from the sound source 102. The dynamic graphic display facilitates use of the stud finder and saves the worker time by providing an intuitive visual indication of the rate at which the tool is approaching a target hidden edge and/or the approximate distance the edge is from the reference point 117 on the main body. This enables a worker to move the tool across a surface quickly and efficiently and reduce the likelihood that the worker will move the tool too far so that it moves beyond the location of the edge.

If the worker continues to slide the layout tool 10 over the stud in the horizontal direction (while continuing to hold the on/off switch in its "on" position), the vertical bar 118 will disappear and the tool 10 will cease making the audible signal when the tool 10 moves past the opposite edge of the stud. The disappearance of the vertical bar 118 and the cessation of the audible signal indicate that the second vertically extending edge of the stud has been detected.

Figure 18:
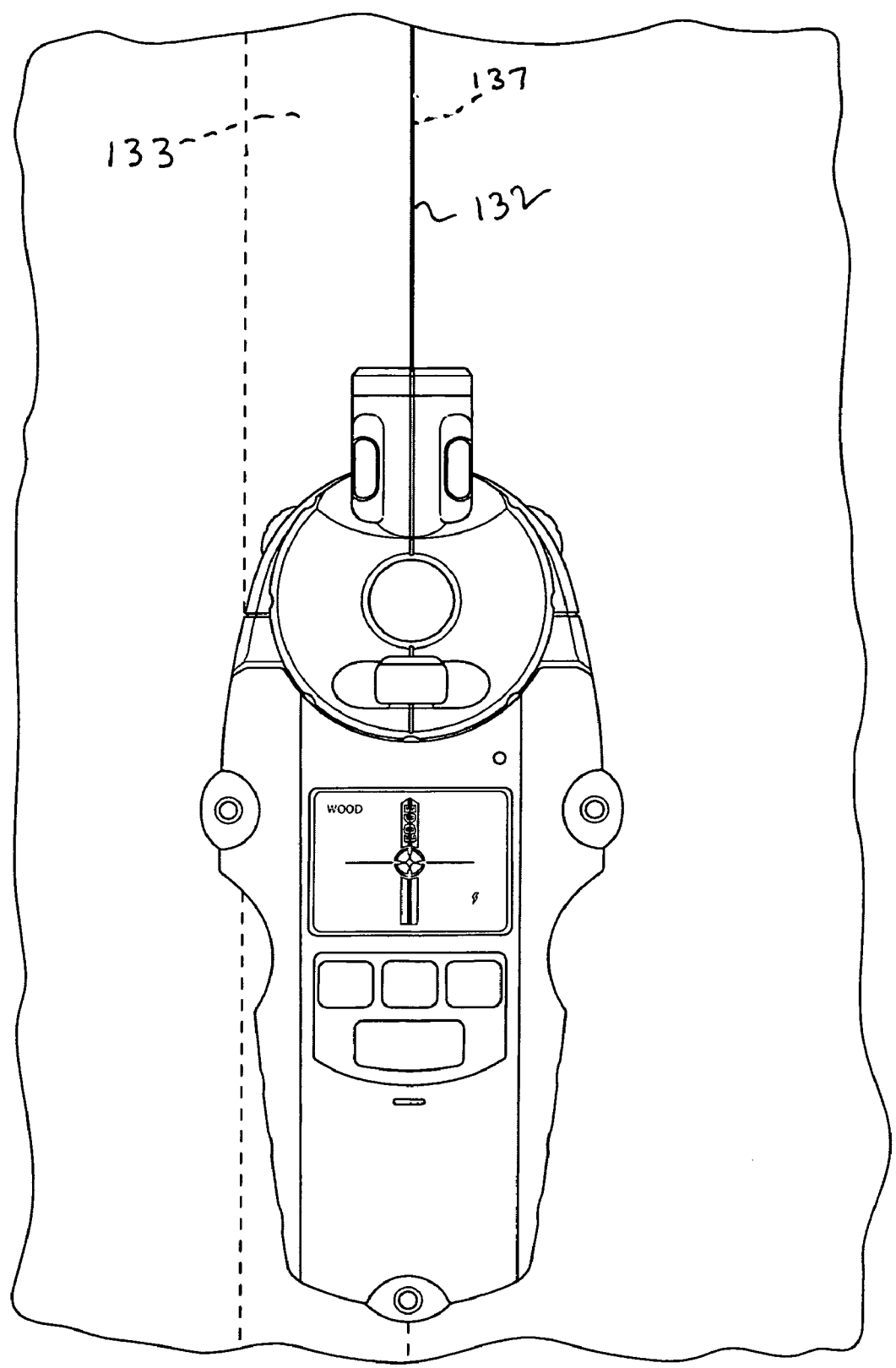
FIG. 18 is similar to FIG. 17, with the tool being positioned so that light from the light source projects on a surface along a path behind which the stud edge is located.

When a vertically extending edge of a stud has been detected, the user can stop movement of the body 12. At this point, the light beam can optionally be oriented so as to be substantially aligned with the stud edge 137 by moving the housing 62 to the 12 o'clock position (if it is not there already) and by orienting the main body 12 so that the angle orientation mechanism (e.g., vial 90) establishes that the beam is vertical. The user can then mark the location of that edge 137 any where along the line of light (see line 132 in FIG. 18) projected on the wall surface using a marker tool, such as a pencil. Alternatively, once an edge has been located, the worker can angularly adjust the main body 12 so that it is vertical when the light source 16 is in its 9 o'clock position as in FIG. 1 by using vial 92 and then make a pencil mark or other mark on the wall in the area inside the end opening 28 or in the area of the V-shaped recess 117. The light beam and marking will thus known to be perpendicular to the stud and can be used to hang shelving, lay down molding or the like. Optionally, the tool can be pinned to the surface with pins 52 to facilitate marking on the wall surface.

As another alternative, the tool 10 can be used to locate horizontal studs. In this alternative, the housing 62 is maintained in the 12 o'clock position and the stud finder is oriented so the longitudinal axis thereof is parallel to the horizontal stud. The housing 12 is moved vertically (up or down) towards the stud while maintaining the body axis generally parallel to the horizontal stud. When the horizontal stud edge is detected by the object detector 14, the angle orientation mechanism (e.g., vial 92 and/or 94) can be used to establish that the housing is horizontal. The laser beam may be oriented to project on the surface to approximate the position of the horizontal stud edge behind the surface.

Figure 15:
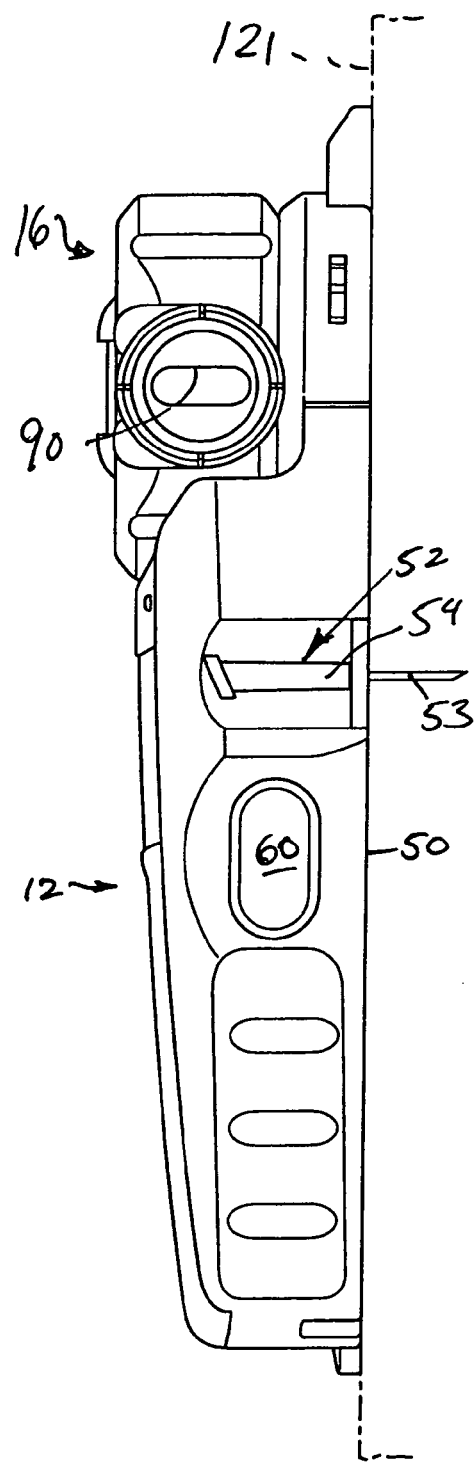
FIG. 15 is a side view of the layout tool of FIG. 1 showing the tool anchored to a wall surface shown in phantom.

In the example shown in FIG. 15, the anchor pins 52 hold the main body 12 in a vertical position on the vertical wall 121 and hold the light source 16 such that the line of light is projected horizontally (to the right). The worker can mark wall locations along this line as appropriate. A horizontal line to the left can be established by pivoting the light source to the position shown in FIG. 1 while the main body 12 remains anchored in place. The spring bias of the detent mechanism locks the light source 16 in proper position to direct to the line of light in a horizontal direction. Orientation can be checked at the workers discretion using the appropriate bubble vial 94 or 92.

Figure 2:
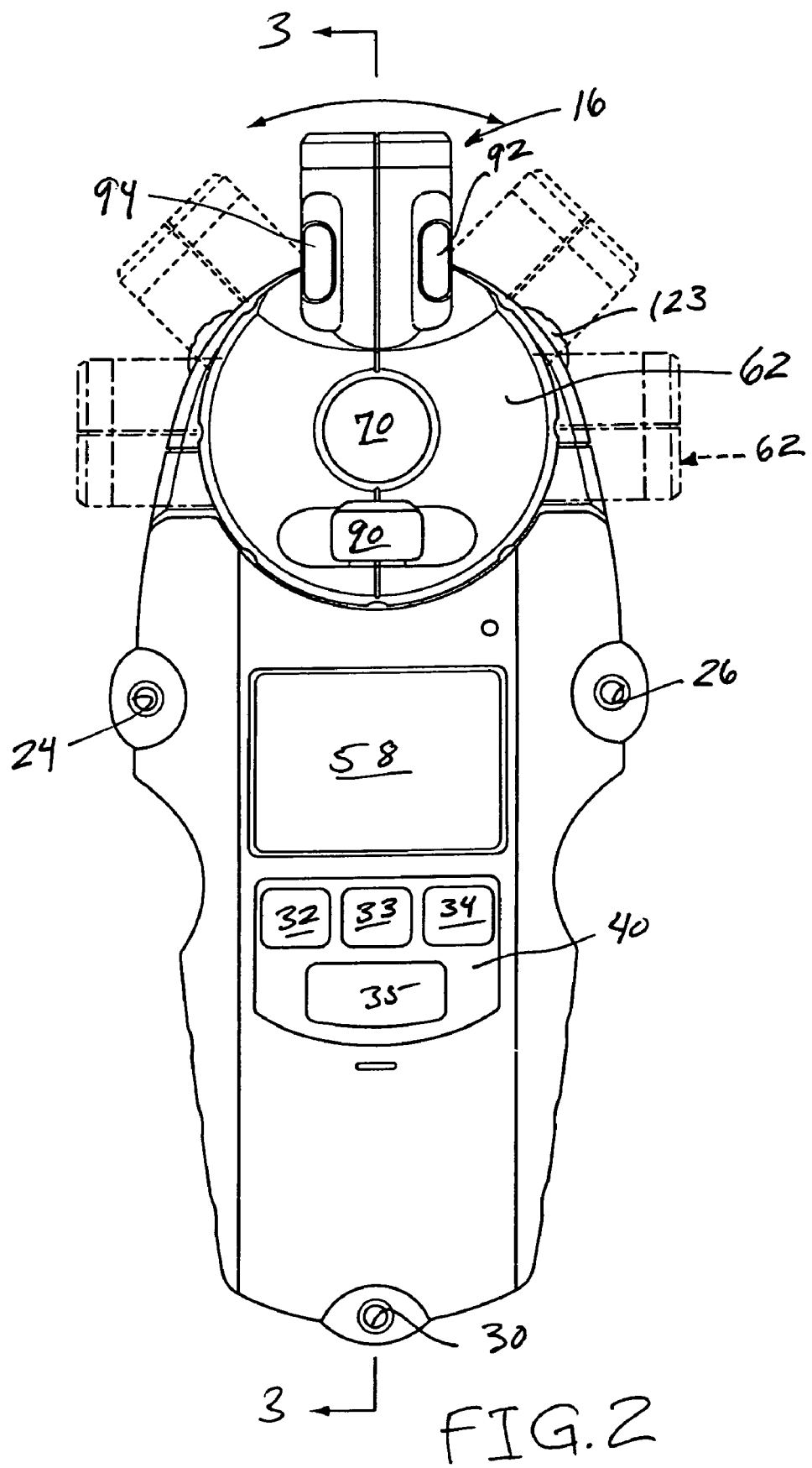
FIG. 2 is a view similar to FIG. 1 except showing a light source releasably locked in a vertical position and showing other positions in which the light source can be releasably locked in dashed lines.

A vertical line of light can be projected by pivoting the light source 16 to the position shown in FIG. 2. Lines of light at forty five degrees can be cast on the wall using the detent mechanism as well. It can be appreciated that the ability to anchor the main body 12 to the wall surface speeds and simplifies the task of marking vertical, horizontal and other lines because once the main body 12 is anchored in a vertical position, the proper alignment of the line of light in the vertical, horizontal and forty five degree positions, for instance, is assured by the detent mechanism. The movable mounting of the light source 16 with respect to the main body 12 also enables a single light source to be used to cast lines of light in a multitude of known directions (up to 360° in some embodiments of a layout tool constructed according to the present invention) on a wall or other surface with respect to the (oriented and optionally anchored) main body 12. This is more cost effective than providing multiple light sources to project light in different directions.

Figure 19:
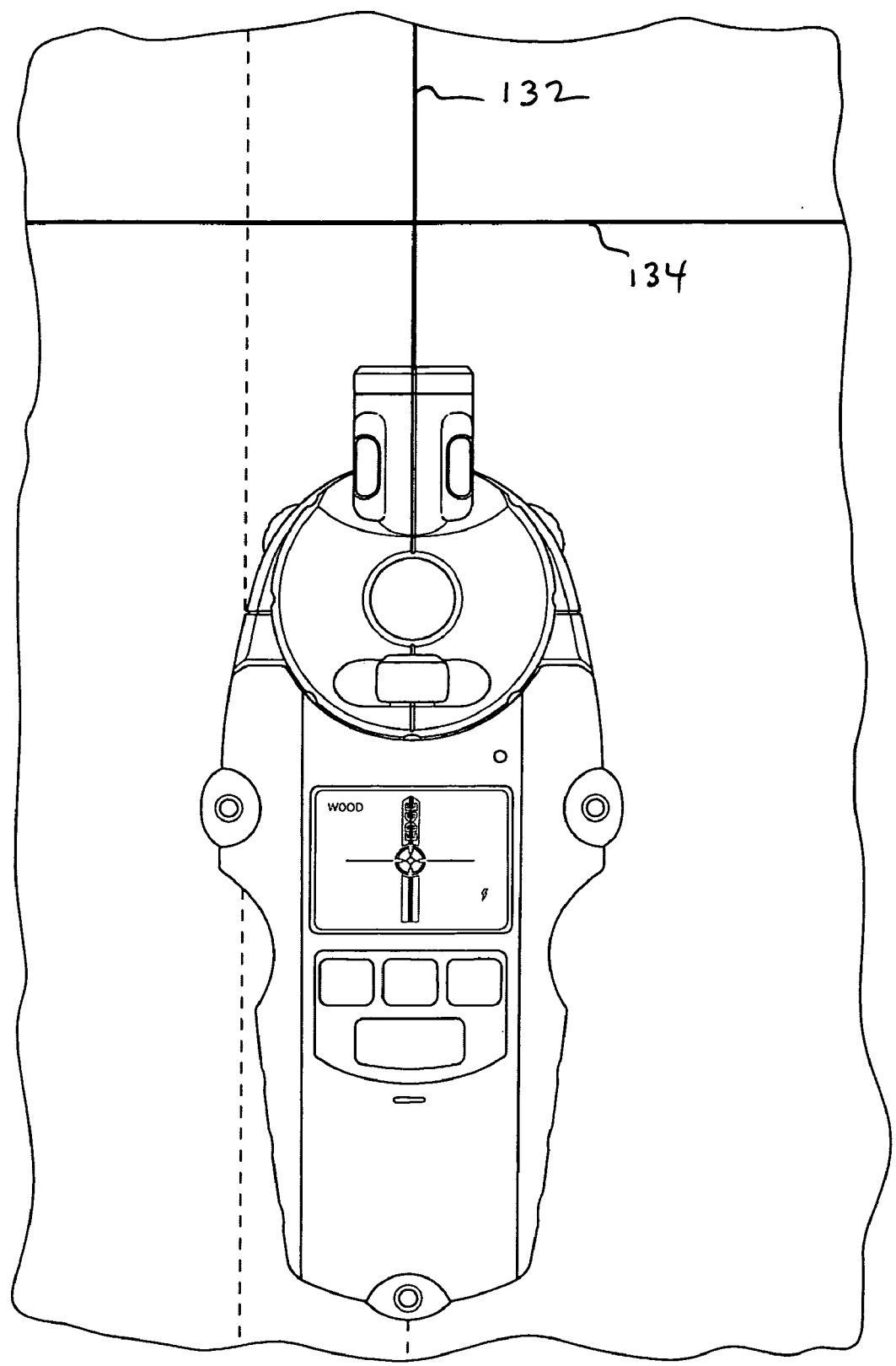
FIG. 19 is similar to FIG. 18, but illustrates the light beam in a "cross-hair" configuration.

As mentioned, the movable mounting of the light source 16 enables a worker to cast a line of light in multiple angular directions even though the tool 10 includes only a single light source. However, it is contemplated to provide other embodiments of layout tools in which multiple light sources are mounted on a main body of a layout tool to provide two or more simultaneous lines of light on a layout surface. These multiple light sources may also be mounted for movement. It is also contemplated to include structure with the light source that splits the beam of light at one or more predetermined or adjustable angles so that a single light source can cast two or more lines of light on a layout surface simultaneously, at predetermined or adjustable angular orientation with respect to one another. For example, in one contemplated embodiment, as shown in FIG. 19, a beam of light from a single light source (e.g., a single laser) may be split into a pair of light beams that are cast on a surface at 90 degrees with respect to one another. This may be accomplished by a beam splitting lens, prism and/or mirror as known in the art. In this instance, a single light source could function to mark with a line of light the location of a vertical reference line coinciding with a vertically extending object (e.g., stud edge), for example, and a horizontal reference line simultaneously. The tool can be pinned to the wall while the perpendicular cross beams are projected as shown in FIG. 19. The tool housing 12, when properly oriented as determined by the angle orientation mechanism, would thus be positioned in FIG. 19 to display a vertical line 132 along a stud edge and a horizontal line 134 that is perpendicular to the stud. It is contemplated that if a beam splitter is used to achieve this result, that the beam splitter or prism can be manually moved or adjusted to change the distance of the horizontal line from the housing 12 and hence the height on a vertical wall. This may facilitate laying out of shelving or molding on the wall at a selected height. Alternatively, two separate lasers can be used, one for the vertical line and one for the adjustable horizontal line. The term "light source" as used herein broadly refers to either a single light emitting structure (e.g., a single laser, LED and/or bulb) and only lenses or beam shaping devices that may or may not be provided, or a multiple of such structures capable of generating more than one line or image on the surface and any such lenses or beam shaping devices (if provided).

In one embodiment, the line of light emitted from the light source extends essentially continuously from the tool across the wall surface.

Other embodiments are contemplated in which the light beam is discontinuous (that is, not solid). For example, it is contemplated to provide a mechanism which causes a beam of light to be cast on a surface as a series of discrete line segments (creating a "dashed" line of light), as a series of discrete points of light (creating a "dotted" line of light), as a combination of these two configurations, or in a wide range of other discontinuous light patterns or configurations.

The microprocessor 100 may be programmed to energize the light source as soon as the on/off switch 60 is moved to its "on" position and to keep the light source energized for as long as the on/off switch 60 is held in its "on" position during the scanning operation (i.e., so that the light comes on during calibration and remains on during the entire scanning and marking operation). Other ways of programming the microprocessor 100 and types of operation are contemplated. For example, the microprocessor 100 may be programmed to keep the light source on even after the switch 60 is released. The light source control switch 35 may be provided to allow the user to override the microprocessor 100 and to toggle the light source 16 on and off as desired. The light source control switch 35 can also be used to turn the light source on and off when the layout tool 10 is used strictly as a layout tool 10 while the object detector is "off".

Figure 16:
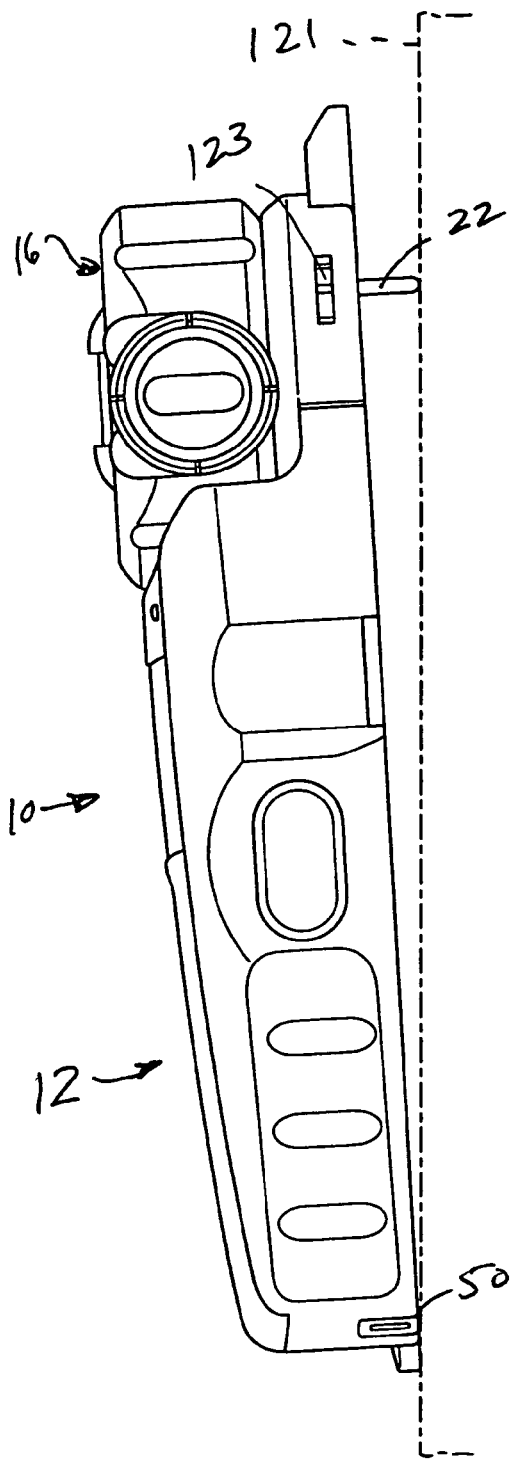
FIG. 16 is a view similar to FIG. 15 except showing a pair of leg structures in a deployed position.
Figure 20:
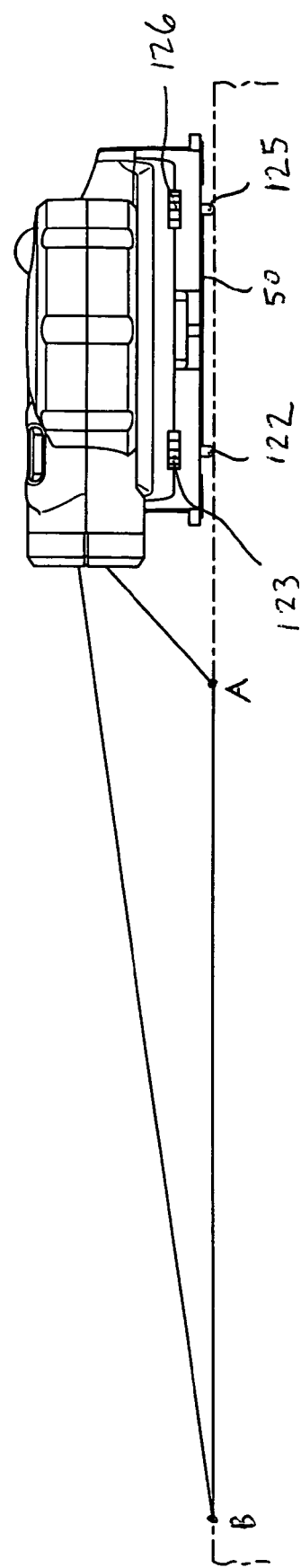
FIG. 20 is a top plan view of the tool and illustrating a manner of adjusting the beam projected thereby.

In addition to (or instead of) the articulating or pivoting housing 62, the tool 10 optionally includes further means operatively coupled to the light source and operable to adjust or change an orientation of the light source relative to the surface. For example, tool includes means for adjusting the distance and/or the angle between the light source in the light source 16 and the layout surface (e.g., a wall or floor). In the illustrative tool 10, this is accomplished by providing individually adjustable surface engaging structures or support structures on the main body of the tool 10. The surface engaging structures may be provided in the form of a pair of legs 122, 125 which can be individually adjusted in length and placed in supporting and spacing relation between a wall (or floor) surface 121 and the main body 12 (see FIGS. 16 and 20, for example).

In the illustrative embodiment, the legs 122, 125 are externally threaded and are threadedly engaged with threading on rotatable leg control mechanisms 123, 126. Rotation of a respective control mechanism 123 or 126 causes the associated leg 122 or 125 to move in or out of the main body, depending on the direction of rotation. Thus, the legs 122, 125 can be deployed by turning the control mechanisms 123, 126. The free ends of the legs 122, 125 may include padding or other structures that protect the work surface from being damaged or inadvertently marked.

The legs 122, 125 can be extended to change the angle of the tool (particularly the light source and the light projected thereby) with respective to the surface (wall or floor) or to change the distance of the light source from the surface. For example, if the tool 10 is placed on a horizontal surface (e.g., to mark a floor), the legs 122, 125 can be deployed to adjust an orientation of the light source relative to the surface in the event that the surface deviates from horizontal in order to ensure that the plane of light emitted by the light source is vertical. The bubble vials 90, 92, 94 can be used to orient the main body 12 of the tool 10 with respect to the floor. For example, if the back 50 is placed on an uneven surface, such as a stucco wall or uneven floor, one or more of the vials may indicate that the housing is not level or plumb. The legs 122, 125 can be adjusted until the desired angular orientation of the housing (e.g., level or plumb) is achieved. In one example, when the housing 62 is in the 12 o'clock position, the plane of light emitted should be perpendicular to a floor surface against which the back 50 rests, as this is how the light source 16 would be mounted and calibrated relative to the back surface 50. In the event that back surface cannot mate with a rough floor surface, vial 90 may indicate if the back surface is not level. This may also signify that the plane of light emitted is not perpendicular to the floor surface and that the line of light projected onto the floor is not properly disposed with respect to the main body 12 to enable a user to establish that the light position corresponds with a detected object beneath the floor surface. The perpendicularity of the plane of light can be established in this case by manipulating one or both of the legs 123, 125 until vial 90 provides a proper reading.

The legs 122, 125 can also be deployed and adjusted to change the angle or height of the light source 16 relative to the wall or floor surface to change the length or position of the line projecting on the surface. Thus, the legs 122, 125 can be used to move the light source outwardly from a layout surface (e.g., wall, floor) in the event that, for example, an obstruction protruding from the layout surface blocks the line of light emitted by the light source or in the event that the layout surface is uneven (e.g., stucco, textured). Also, moving the light source away from the layout surface may improve coverage of the layout surface with the line of light by raising the height of the included angle of the incident light. For example, as can be easily appreciated from FIG. 20, further extending leg 122 will raise the included angle so that the end points A and B of the line of light incident on a surface will be disposed further away from the tool 10, while lowering the leg 122 will lower the included angle so that end points A and B of the line of light will be disposed closer to the tool 10. The anchor pins 52 are operable to secure the tool 10 to the surface when the legs 122, 125 are deployed.

It can be appreciated that with the tool configured as illustrated in FIG. 19, extending or retracting legs 122, 125 can be used to move the orthogonal or horizontal line 134 towards or away from the tool body (i.e., extending legs 122, 125 will move line 134 away from the tool body and vice versa.

It should be understood that in one embodiment, the adjustable legs 122 are the only adjusting means, and there is no other means for adjusting the orientation of the light source (e.g., the orientation of light source 16 is fixed relative to main body 12).

The back surface 50 (and end surface of legs 122, 125 when deployed can be considered as a reference surface which is constructed to engage with the surface which is being scanned or worked upon.

The present invention further contemplates that the image projected onto the surface being scanned or worked upon need not be a line. Any image that advises the user that can convey to the user that the image is in a desired relationship with respect to the object hidden behind the surface. For example, the image may be of any shape or configuration indicating an edge of a stud, the center of a stud, a character that is perpendicular to a stud, etc.

Thus, while the invention has been disclosed and described with reference with a limited number of embodiments, it will be apparent that variations and modifications may be made thereto without departure from the spirit and scope of the invention and various other modifications may occur to those skilled in the art. Therefore, the following claims are intended to cover modifications, variations, and equivalents thereof.

What is claimed is:

1. A device for determining a location of a stud hidden behind a wall surface, comprising:
   a body having a surface engaging portion adapted to engage the wall surface behind which the stud is located;
   an object detector carried by said body, said object detector capable of detecting the stud hidden from view behind the wall surface;
   a light source carried by the body, said light source capable of projecting intersecting, orthogonal lines of light along the wall surface engaged by the surface engaging portion of the body; and
   an angular orientation mechanism that establishes the intersecting, orthogonal lines of light in a desired orientation.

2. The device of claim 1, wherein the light source comprises a first laser for projecting a first of said lines of light and a second laser for projecting a second line of said lines of light.

3. The device of claim 1, wherein the light source comprises a single laser and a beam splitter to form said intersecting orthogonal lines or light.

4. The device of claim 1, wherein said angular orientation mechanism comprises a pendulum.

5. The device of claim 1, wherein said angular orientation mechanism comprises a bubble vial.

6. The device of claim 1, further comprising a fastener capable of fastening the body to the surface.

7. A device, comprising:
   a first body that can be secured to a vertical surface;
   a fastener for fastening the first body to the vertical surface;
   a second body pivotable about a rotational axis;
   a first bubble vial mounted on said second body and a second bubble vial mounted on said second body, said first and second bubble vials being perpendicularly disposed relative to one another;
   a light source carried by said second body, said light source configured to generate a plane of light so that a line of light is projected onto the vertical surface on which the first body is secured; and
   a light adjustment structure to change an angle of the light source relative to the vertical surface, wherein adjustment of the adjustment structure changes a length of the line projected onto the surface.

8. A device according to claim 7, wherein said light adjustment structure comprises at least one extendable and retractable leg.

9. A device according to claim 8, wherein said at least one leg is arranged to contact the vertical surface.

10. A device according to claim 7, further comprising an object detector carried by said first body.

11. A device according to claim 7, wherein said fastener comprises at least one pin.

12. The device of claim 7, wherein the light source comprises a laser and a lens.

13. A device, comprising:
    a first body that can be secured to a vertical surface;
    a fastener for fastening the first body to the vertical surface;
    a second body pivotable about a rotational axis;
    a first bubble vial mounted on said second body and a second bubble vial mounted on said second body, said first and second bubble vials being perpendicularly disposed relative to one another;
    a light source carried by said second body, said light source configured to generate a plane of light so that a line of light is projected onto the vertical surface on which the first body is secured; and
    a light adjustment structure to change an angle of the light source relative to the vertical surface,
    wherein adjustment of the adjustment structure changes a height of an included angle of light projected on the surface.

14. The device of claim 13, wherein the light source comprises a laser and a lens.

15. A laser level device, comprising:
    a body having a surface engaging portion adapted to engage a wall surface;
    a fastener capable of fastening the body to the wall surface; and
    a light source carried by the body, said light source capable of projecting intersecting, orthogonal lines of light along the wall surface.

16. A device according to claim 15, wherein said light source comprises a plurality of lasers.

17. A device according to claim 15, wherein said light source comprises a single laser and a beam splitter.

18. A device according to claim 15, wherein said fastener comprises at least one pin.

19. A method of operating a laser level device comprising:
securing a light emitting device onto a vertical surface; and
projecting orthogonal, intersecting lines from the device onto the vertical surface, wherein one of said lines is vertical and another of said lines is horizontal.

20. The method according to claim 19, wherein said projecting of orthogonal, intersecting lines comprises emitting light from two lasers.

21. The method according to claim 19 wherein said projecting of orthogonal, intersecting lines comprises emitting a beam of light from a single laser, and splitting said bam to form said horizontal and vertical lines.

22. The method according to claim 19, wherein said securing comprises using a pin to secure the device to the vertical surface.

23. The method according to claim 19, further comprising operating an object detector carried by the housing to detect an object behind the surface.

24. The method of claim 19, further comprising changing an angle of the light emitting device relative to the vertical surface.

25. A method of operating a laser level device comprising:
placing a first body against a vertical surface;
rotating a second body, said second body mounted for pivotal rotation on the first body, said second body carrying a light source, a first bubble vial, and a second bubble vial;
projecting a line of light onto the vertical surface; and
changing an angle of said light source relative to the vertical surface so as to change a length of the line of light projected onto the vertical surface.

26. A method according to claim 25, wherein said changing of said angle comprises extending or retracting at least one leg.

27. A device for determining a location of a vertical stud hidden behind a wall surface, comprising:
a body having a surface engaging portion adapted to engage a wall surface;
an object detector carried by the body, the object detector capable of detecting a stud hidden from view behind the wall surface;
a light source carried by the body, the light source including at least one lens that forms the light generated by the light source into intersecting, orthogonal lines of light that are projected along the wall surface engaged by the surface engaging portion of the body; and
an angular orientation mechanism that establishes a first of the intersecting, orthogonal lines in a vertical orientation and that establishes a second of the intersecting, orthogonal lines in a horizontal orientation;
the object detector providing an audio and/or visible indicator that an edge of the stud has been detected, and thus indicating that the first, vertically oriented line of light, as established by the angular orientation mechanism, extends along the wall surface at a position on the wall surface substantially in alignment with a position of an edge of the stud that has been detected behind the wall surface,
wherein when the first, vertically oriented line of light extends along the wall surface in alignment with the edge of the stud, the second, horizontally oriented line of light extends generally perpendicularly to the edge of the stud that has been detected behind the wall surface.

28. The device of claim 27, further comprising an anchor that secures the body to the wall surface to enable the device to be self-supported in an orientation in which the horizontally oriented line extends perpendicularly to the edge of the stud that has been detected.

29. The device of claim 28, wherein the angular orientation mechanism comprises a pendulum.

30. The device of claim 27, wherein the at least one lens comprises two lenses, including a first lens that projects the horizontal line and a second lens that projects the vertical line.

31. The device of claim 30, wherein the light source comprises two lasers, a first laser generating the horizontal line and a second laser for generating the vertical line.

32. The device of claim 27, wherein the light source comprises only a single light generator.

33. The device of claim 27, wherein the first of the intersecting lines is formed from a projected plane of light that impinges on the vertical wall to form the vertical line of light on the wall surface, and wherein the projected plane of light is constructed and arranged to also impinge on a ceiling that is adjacent to the vertical surface so as to form a line of light on the ceiling that is aligned with the edge of the stud that has been detected.

34. A laser level device, comprising:
a first housing having a surface engaging portion adapted to engage a wall surface;
a second housing that is mounted on the first housing and is rotatable relative to the first housing;
a light source carried by the rotatable second housing, the light source including at least one lens that forms the light generated by the light source into intersecting, orthogonal lines of light that are projected along the wall surface engaged by the surface engaging portion of the first housing; and
an angular orientation mechanism that establishes a first of the intersecting orthogonal lines in a vertical orientation, and that establishes a second of the intersecting, orthogonal lines in a horizontal orientation.

35. The laser level device according to claim 34, wherein the angular orientation mechanism comprises a pendulum.

36. The laser level device according to claim 35, wherein the light source comprises a first laser and a first lens that generates the first of the orthogonal lines, and a second laser and a second lens that generates the second of the orthogonal lines.

37. The laser level device according to claim 36, further comprising an anchor device that secures the laser level device to the wall surface.

38. The laser level device according to claim 36, further comprising a pin arrangement for hanging the laser level device on the wall surface.

39. The laser level device according to claim 34, wherein the light source comprises only a single laser.

40. The laser level device according to claim 34, wherein the rotatability of the second housing enables the intersecting, orthogonal lines to be optionally projected towards the left of the device or towards the right of the device.

* * * * *